B. G. BRAINE.
ELECTRICALLY CONDUCTIVE RAILWAY RAIL JOINT OR CONNECTION.
APPLICATION FILED OCT. 25, 1907.

898,430.

Patented Sept. 15, 1908.

WITNESSES:
E. A. Pell
S. C. Rogers

INVENTOR
Bancroft G. Braine,
BY
Wm. H. Canfield
ATTORNEY

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

ELECTRICALLY-CONDUCTIVE RAILWAY-RAIL JOINT OR CONNECTION.

No. 898,430.   Specification of Letters Patent.   Patented Sept. 15, 1908.

Application filed October 25, 1907. Serial No. 399,225.

*To all whom it may concern:*

Be it known that I, BANCROFT G. BRAINE, a citizen of the United States, residing at New York city, borough of Brooklyn, in the county of Kings and State of New York, have invented certain new and useful Improvements in Electrically-Conductive Railway-Rail Joints or Connections; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a rail joint, and particularly one of the "continuous" style, and is designed to provide a joint with connecting plates, or rail joint plates, each one of which contacts with the under side of the heads of the rails and also with the base flanges of the rails, and the connection between the connecting plates and the rails is made by welding, causing a molecular union at one of the contacting points, and providing an adjustable contact at the other contacting point. That is, the base flanges may be electrically or otherwise welded to the connecting plates, and the contact with the heads adjusted and taken up by the usual bolts and nuts, or vice versa. The welding can be carried along the entire length of the plates at the desired point, or it can be done by means of horizontal welds at the center and ends of the plates, or the ends of the plates alone, so long as the welded portions are horizontally spaced.

The invention is illustrated in the accompanying drawing, in which

Figure 1:
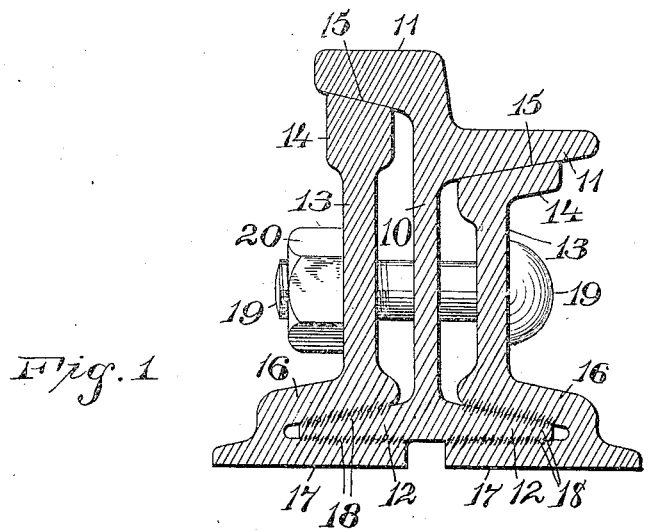
Figure 2:
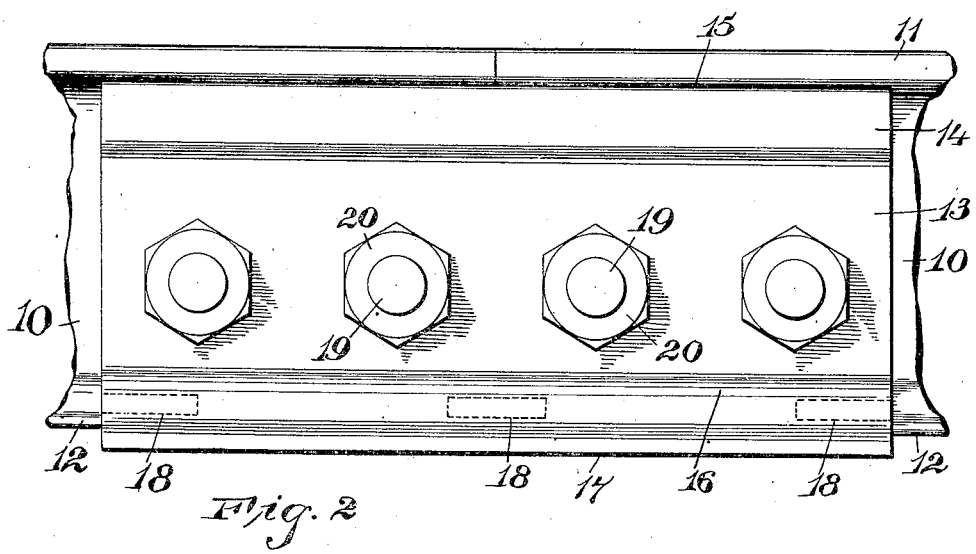

Figure 1 is a section of a rail joint at a point of welding, and Fig. 2 is a side view of the improved rail joint.

I illustrate, in the drawing, a rail 10 which may be of any contour and which has the horizontal head portion 11 and the base flanges 12. On each side of the abutting rails are the rail joint plates or connecting plates 13, as they will be hereinafter called, the plates having the portions 14 contacting with the under sides of the head of the rail, as at 15. The connecting plates are also provided with foot flanges 16 and the base portions 17. The foot flanges 12 of the rail, the base flanges 16 of the plates and the base portions 17 are welded together, as at 18, to form a molecular union and to furnish an absolutely positive electrical contact. This is essential where the rail is used as a conductor in a system for signaling, propulsion, or similar functions. The welded joints 18 are preferably made in a horizontal direction, and are disposed so as to be horizontally separated or spaced apart. The preferred form is to weld the top or bottom ends of the plates to the rail, and also to weld the top or bottom abutting ends of the rails to the connecting plates. The particular disposition of these welded portions is to make a stronger joint, because it is well known that where a horizontally placed truss or beam is subjected to a vertical or bending load, the extreme tension or compression strains come on the top and bottom, the top being under a compression, and the bottom under a tension, there being practically no bending strain in the horizontal center. In welded joints as heretofore made, the vertical center of the rails and the connecting plates have been welded where they have a chance to take up very little of the bending load, but in my construction as herein illustrated and described, the welded points are placed far from the vertical center so that the portions of the joints that are under the greatest strain are thoroughly strengthened.

I provide bolts 19 and the usual nuts 20 to clamp the connecting plates to the rails to adjust and to take up the contact at 15, between the plates and the rail. When rails are manufactured, the rolls wear away, and this is also true of the rolls that are used for rolling the connecting plates for the rail joint. It will be seen from this that a slight variation is apt to occur, because the rails and the plates may differ slightly as to their dimensions, and to take in all these inequalities the bolts and nuts are used.

The welded joints, in this construction, are superior to the contact by metallic plates, where rust and dirt will affect the electrical conductivity of the joints, and combined with the fastening bolts, make a very solid structure and a stiff smooth joint which can be set up even if the rails and the connecting plates are of a slightly different dimension than is expected.

Having thus described my invention, what I claim is:—

1. A rail joint consisting of the abutting ends of two rails having heads and base flanges, connecting plates contacting with heads and the base flanges, horizontally disposed and horizontally spaced welded portions connecting some of the contacting portions of the plates with the rails, and means for mechanically adjusting the pressure on the other contacting portions.

2. A rail joint consisting of the abutting ends of two rails having heads and base flanges, connecting plates contacting with heads and the base flanges, horizontally disposed and horizontally spaced welded portions connecting some of the contacting portions of the plates with the rails, and means passing through the rails and the plates and bearing on the outside of the plates for adjusting the pressure on the other contacting portions.

3. A rail joint consisting of the abutting ends of two rails having heads and base flanges, connecting plates contacting with heads and the base flanges, horizontally disposed and horizontally spaced welded portions connecting some of the contacting portions of the plates with the rails, and bolts passing through the rails and the plates with nuts thereon for adjusting the pressure on the other contacting portions.

4. A rail joint consisting of the abutting ends of two rails having heads and base flanges, connecting plates contacting with heads and the base flanges, horizontally disposed and horizontally spaced welded portions joining the base flanges to the connecting plates, and bolts passing through the rails and the plates for adjusting the contact between the plates and the heads of the rails.

5. A rail joint consisting of the abutting ends of two rails having heads and base flanges, connecting plates contacting with the base flanges and having clasping portions to embrace the base flanges, horizontally disposed welded portions connecting the ends of the rail clasping portions of the plates with the base flanges, and means for adjusting the pressure between the heads of the rails and the connecting plates.

6. A rail joint consisting of the abutting ends of two rails having heads and base flanges, connecting plates contacting with the base flanges and having clasping portions to embrace the base flanges, horizontally disposed welded portions connecting the ends of the rail clasping portions of the plates with the base flanges, and bolts passing through the rails and the plates with nuts for adjusting the pressure on the contact between the plates and the heads of the rails.

7. A rail joint consisting of the abutting ends of two rails having heads and base flanges, connecting plates contacting with the base flanges and having clasping portions to embrace the base flanges, horizontally disposed welded portions connecting the ends of the rail clasping portions of the plates with the base flanges, horizontally disposed welded portions connecting the ends of the base flanges with the rail clasping portions of the plates, and bolts passing through the rails and the plates with nuts for adjusting the pressure between the plates and the heads of the rails.

8. A rail joint consisting of the abutting ends of two rails having heads and base flanges, connecting plates contacting with the heads of the rails and the base flanges, portions of the connecting plates and the rails being welded together, and means passing through the rails and the plates to adjust the pressure on the other contacting portions.

In testimony, that I claim the foregoing, I have hereunto set my hand this 17th day of October 1907.

BANCROFT G. BRAINE.

Witnesses:
E. F. SCHERMERHORN,
BENJ. WOLHAUPTER.